US012785156B2

(12) United States Patent
Morimoto et al.

(10) Patent No.: US 12,785,156 B2
(45) Date of Patent: Nov. 3, 2026

(54) LITHIUM ION SECONDARY BATTERY SUPPORT USING SOLID ELECTROLYTE, AND LITHIUM ION SECONDARY BATTERY USING SAID SUPPORT

(71) Applicant: NIPPON KODOSHI CORPORATION, Kochi (JP)

(72) Inventors: Kenta Morimoto, Kochi (JP); Kentaro Ogawa, Kochi (JP); Masahiro Kuroiwa, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 458 days.

(21) Appl. No.: 18/291,435

(22) PCT Filed: Aug. 22, 2022

(86) PCT No.: PCT/JP2022/031514

§ 371 (c)(1),
(2) Date: Jan. 23, 2024

(87) PCT Pub. No.: WO2023/027008

PCT Pub. Date: Mar. 2, 2023

(65) Prior Publication Data

US 2025/0105369 A1 Mar. 27, 2025

(30) Foreign Application Priority Data

Aug. 24, 2021 (JP) ................................ 2021-136169

(51) Int. Cl.
*H01M 10/42* (2006.01)
*H01M 10/0525* (2010.01)
*H01M 10/0562* (2010.01)

(52) U.S. Cl.
CPC ... *H01M 10/4235* (2013.01); *H01M 10/0525* (2013.01); *H01M 10/0562* (2013.01)

(58) Field of Classification Search
CPC ......... H01M 10/4235; H01M 10/0525; H01M 10/0562
USPC .......................................................... 429/122
See application file for complete search history.

(56) References Cited

U.S. PATENT DOCUMENTS

| | | | |
|---|---|---|---|
| 8,252,449 B2 | 8/2012 | Tsukuda et al. | |
| 9,472,832 B2 | 10/2016 | Agarwal et al. | |
| 11,710,856 B2 | 7/2023 | Ogawa et al. | |
| 11,749,835 B2 | 9/2023 | Ogawa et al. | |
| 2007/0287062 A1 | 12/2007 | Tsukuda et al. | |
| 2017/0358817 A1* | 12/2017 | Sawamoto | B32B 27/34 |
| 2020/0144661 A1 | 5/2020 | Ogawa et al. | |
| 2020/0208351 A1* | 7/2020 | Harada | D21H 13/20 |
| 2020/0212500 A1 | 7/2020 | Ogawa et al. | |
| 2021/0104773 A1* | 4/2021 | Ozawa | H01M 10/058 |
| 2022/0247035 A1* | 8/2022 | Ishiguro | D01F 1/10 |
| 2023/0193534 A1 | 6/2023 | Shigematsu | |

FOREIGN PATENT DOCUMENTS

| | | |
|---|---|---|
| JP | WO2005/101432 A1 | 3/2008 |
| JP | 2014-096311 A | 5/2014 |
| JP | 2016-031789 A | 3/2016 |
| JP | 2017-103146 A | 6/2017 |
| JP | 2018-067458 A | 4/2018 |
| JP | 2020-077488 A | 5/2020 |
| JP | 2020-107449 A | 7/2020 |
| JP | 2020-161243 A | 10/2020 |
| JP | 2021-034325 A | 3/2021 |
| WO | 2021/200621 A1 | 10/2021 |

OTHER PUBLICATIONS

Oct. 25, 2022 International Search Report issued in International Patent Application No. PCT/JP2022/031514.
Aug. 18, 2025 extended Search Report in European Application No. 2 286 1296.6.

* cited by examiner

*Primary Examiner* — James M Erwin
(74) *Attorney, Agent, or Firm* — Oliff PLC

(57) ABSTRACT

A support for a lithium ion secondary battery is included in a solid electrolyte layer of a lithium ion secondary battery, wherein the support is paper or a nonwoven fabric in which the thermal dimensional change rates in the machine direction and cross direction are both −10 to 5%, the air permeability is 1 to 50 L/cm$^2$/min., and the post-heat-treatment bending resistances in the machine direction and the cross direction are in the range of 5 to 250 mN.

4 Claims, No Drawings

LITHIUM ION SECONDARY BATTERY SUPPORT USING SOLID ELECTROLYTE, AND LITHIUM ION SECONDARY BATTERY USING SAID SUPPORT

TECHNICAL FIELD

The present invention relates to a support for a lithium ion secondary battery included in a solid electrolyte layer interposed between a positive electrode and a negative electrode of a lithium ion secondary battery, and a lithium ion secondary battery including a solid electrolyte layer including this support.

BACKGROUND ART

As secondary batteries having a high energy density, lithium ion secondary batteries using a liquid electrolyte (hereinafter, an electrolytic solution) have been used. A lithium ion secondary battery using an electrolytic solution has a configuration in which the lithium ion secondary battery is filled with an electrolytic solution with a separator interposed between a positive electrode and a negative electrode.

In the lithium ion secondary battery, an organic electrolytic solution is mainly used as the electrolytic solution. The organic electrolytic solution, which is a liquid and is flammable, may cause liquid leakage or ignite. Therefore, in order to enhance the safety of the lithium ion secondary battery, there has been developed a lithium ion secondary battery using a solid electrolyte (hereinafter, an all-solid-state battery) instead of the electrolytic solution. As a matter of course, the electrolyte is solid in the all-solid-state battery. Thus, the all-solid-state battery has no liquid leakage, and is flame-retardant and highly heat-resistant as compared with the electrolytic solution. The all-solid-state battery has attracted attention as a lithium ion secondary battery excellent in safety. Since the all-solid-state battery has high safety, small all-solid-state batteries for, for example, wearable devices in direct contact with the skin have been mass-produced.

In addition, unlike the lithium ion secondary battery using an electrolytic solution, the all-solid-state battery is a battery having small characteristic deterioration at a high temperature, and thus requires no cooling device, which means that the all-solid-state battery is a secondary battery that is also advantageous for improvement of energy density per volume of a battery pack. Being advantageous as a secondary battery having a high volume energy density, the all-solid-state battery is expected to further increase in size for electric cars or the like.

A solid electrolyte layer interposed between a positive electrode and a negative electrode of the all-solid-state battery is required to have a function of ion conduction of lithium ions between the positive electrode and the negative electrode, and a function of preventing a short circuit between a positive electrode active material and a negative electrode active material. In addition, the solid electrolyte layer is required to have a small thickness in order to enhance volume energy density and reduce internal resistance.

Examples of a method for forming the solid electrolyte layer include a method in which a solid electrolyte and a binder are mixed and rolled under heating to form a sheet, and a method in which a solid electrolyte slurry is applied onto an electrode and dried.

However, in the case of forming the solid electrolyte layer for an all-solid-state battery used for a large battery for electric cars or the like, the solid electrolyte layer obtained by, for example, the method of rolling under heating to form a sheet is broken or cracked during handling. In addition, when the method of applying and drying a slurry containing a solid electrolyte on an electrode is used, a strain is generated in the solid electrolyte layer during drying, resulting in the occurrence of cracks. Therefore, it is difficult to stably form a thin and uniform solid electrolyte layer. If a thin and uniform solid electrolyte layer cannot be stably formed, ion conduction deteriorates, and furthermore, a short circuit occurs.

On the other hand, in order to prevent a short circuit, the thickness of the solid electrolyte layer can be increased. However, in a case in which the thickness is increased, the battery has a larger size, resulting in a decrease in volume energy density, an increase in inter-electrode distance, and an increase in internal resistance.

In order to solve the above problems, the all-solid-state battery is known to adopt a solid electrolyte layer in which a thin-film sheet (hereinafter, a support) contains a solid electrolyte, and the solid electrolyte and the support are integrated. In addition, various configurations related to a support for an all-solid-state battery and a base material for a lithium ion secondary battery have been proposed.

CITATION LIST

Patent Literature

Patent Literature 1: JP 2017-103146 A
Patent Literature 2: JP 2016-31789 A
Patent Literature 3: JP 2020-77488 A
Patent Literature 4: JP 2020-161243 A
Patent Literature 5: WO 2005/101432 A
Patent Literature 6: JP 2018-67458 A

SUMMARY OF INVENTION

Technical Problem

Patent Literature 1 discloses a technique related to a solid electrolyte sheet having a plurality of through-holes formed by etching a film serving as a support. It is disclosed that an all-solid-state battery excellent in energy density and output characteristics can be provided by filling the through-holes formed by etching with a solid electrolyte.

However, in the case of fabricating the solid electrolyte sheet of Patent Literature 1, the through-holes are filled with the solid electrolyte. Thus, the solid electrolyte fills only the inside of the formed through-holes. Therefore, the film that is an insulator remains in a portion other than the through-holes, so that an interface through which lithium ions cannot pass is formed between a positive electrode or a negative electrode and the film portion.

That is, interfacial resistance between the solid electrolyte sheet and the positive electrode or the negative electrode tends to be high. In the all-solid-state battery using this support, there is a demand for a further decrease in resistance of the all-solid-state battery.

Patent Literature 2 discloses a technique related to a nonwoven fabric that is a solid electrolyte sheet including a solid electrolyte on the surface and inside of the nonwoven fabric, in which the used nonwoven fabric has a weight per square meter of 8 g or less and a thickness of 10 to 25 μm.

A solid electrolyte layer formed using the nonwoven fabric described in Patent Literature 2 as a support can hold the solid electrolyte required for ion conduction between a positive electrode and a negative electrode while having a self-supporting property. This makes it possible to fabricate a battery in which an increase in impedance is suppressed.

Patent Literature 3 discloses a technique related to a solid electrolyte sheet in which a support having a porosity of from 60% to 95% inclusive, a thickness of from 5 μm to less than 20 μm, and being heat-resistant is filled with a solid electrolyte. It is disclosed that this solid electrolyte sheet has a self-supporting property in spite of having a small thickness, and is excellent in heat resistance, so that a short circuit can be prevented even when pressing is performed at a high temperature. In addition, this solid electrolyte sheet, which can be pressed at a high temperature, contributes to a decrease in interfacial resistance between the solid electrolytes, and can increase the output of a battery.

However, in a case in which the solid electrolyte layer using the support described in Patent Literature 2 or Patent Literature 3 is insufficiently filled with the solid electrolyte, the battery has a higher internal resistance. Furthermore, in the solid electrolyte layer using the support described in Patent Literature 2 or Patent Literature 3, when the positive electrode, the solid electrolyte layer, and the negative electrode are pressurized and integrated, the support inside the solid electrolyte layer is deformed, and a pass line of lithium ions is disconnected, resulting in an increase in internal resistance.

In addition, the support of Patent Literature 3 contains heat-resistant fibers such as aramid fibers and $Al_2O_3$ in which deformation of the fibers due to heat is small. However, the support contains a large amount of binder fibers in which deformation of the fibers due to heat is large in order to increase the strength of the solid electrolyte layer, and thus has a large thermal dimensional change. In a case in which the support has a large thermal dimensional change, the support shrinks at the time of applying a solid electrolyte slurry to the support and drying a solvent, and irregularities are generated on the surface of the obtained solid electrolyte layer. When the solid electrolyte layer having irregularities on the surface and the positive electrode or the negative electrode are stacked together, interfacial adhesion deteriorates, and the internal resistance of the all-solid-state battery increases. In order to improve the interfacial adhesion between the positive electrode or the negative electrode and the solid electrolyte layer, high-temperature pressing can be performed. However, even in the case of using the support of Patent Literature 3 that can be subjected to high-temperature pressing, the support inside the solid electrolyte layer is deformed by the high-temperature pressing, and the formed pass line of lithium ions is disconnected. Thus, the battery has a high internal resistance.

Patent Literature 4 discloses a technique related to a nonwoven fabric base material for a lithium secondary battery separator, the nonwoven fabric base material containing stretched polyester fibers, and unstretched polyester fibers and wet-heat-adhesive fibers as binder fibers.

It is disclosed that the nonwoven fabric base material excellent in heat resistance, in which the stretched polyester fibers form a skeleton, and excellent in thermal dimensional stability can be provided by containing the stretched polyester fibers.

In addition, the unstretched polyester fibers are softened or melted by a hot-press treatment such as calendering, and firmly bonded to other fibers. The wet-heat-adhesive fibers are disclosed to exhibit an adhesive function by being fluidized or easily deformed in a wet state. It is disclosed that the nonwoven fabric base material for a lithium secondary battery separator having a high tensile strength and high productivity can be provided by containing these binders.

However, even in the nonwoven fabric base material excellent in thermal dimensional stability of Patent Literature 4, it is necessary to contain a large amount of binder fibers in the constituent fibers in order to obtain a nonwoven fabric base material for a lithium ion secondary battery separator having high productivity. Thus, the thermal dimensional change increases, and the internal resistance of the battery increases similarly to the support of Patent Literature 3.

In addition, since the wet-heat-adhesive fibers contained in the nonwoven fabric base material are fluidized or deformed when exhibiting an adhesive function as described above, the wet-heat-adhesive fibers in the nonwoven fabric base material cannot hold a fibrous state, and may block voids between fibers. Furthermore, when a large amount of binder fibers that cannot hold a fibrous shape are contained, the density increases. As a result, the solid electrolyte insufficiently permeates the nonwoven fabric base material, and it is difficult to uniformly fill the nonwoven fabric base material with the solid electrolyte, resulting in an increase in the internal resistance of the battery.

In addition, as a related technique, a technique related to a separator for an electrochemical element excellent in heat resistance has been disclosed.

Patent Literature 5 discloses a technique related to a separator for an electrochemical element that is a wet nonwoven fabric containing fibrillated heat-resistant fibers having all of a softening point, a melting point, and a thermal decomposition temperature of from 250° C. to 700° C. inclusive, and has a dimensional change rate of −3 to +1% when heat-treated at 250° C. for 50 hours. It is disclosed that an electrochemical element having excellent reliability even when the element obtained by winding is heat-treated at a high temperature, that is, having a high heat resistance and a low resistance can be obtained by using the separator for an electrochemical element described in Patent Literature 5.

Patent Literature 6 discloses a technique related to a base material for a lithium ion secondary battery separator, the base material having a heat shrinkage rate at 150° C. of 2.0% or less. The base material for a separator described in Patent Literature 6 is used as a separator for a lithium ion battery by providing a coating layer containing inorganic particles on the base material for a separator.

It is disclosed that because the base material for a separator described in Patent Literature 6 has a heat shrinkage rate of 2.0% or less, irregularities are hardly generated on the separator even when the separator is heated and dried at the time of battery assembly. It is further disclosed that in the case of a separator having coating layers on opposite surfaces of the base material for a separator, the problem that the separator is curled to a side where the coating layer has a smaller thickness can be solved in addition to the problem that irregularities are generated on the separator during heating and drying at the time of battery assembly.

The present invention has been made in view of the above problems, and an object of the present invention is to reduce irregularities of the surface of a solid electrolyte layer, and improve interfacial adhesion between a positive electrode or a negative electrode and the solid electrolyte layer, which contributes to reduction of interfacial resistance between the positive electrode or the negative electrode and the solid electrolyte layer. It is another object to obtain a solid electrolyte layer having a low internal resistance by sufficiently forming a pass line of lithium ions inside the solid electrolyte layer. In addition, it is another object to maintain the pass line of lithium ions by suppressing deformation of a support inside the solid electrolyte layer occurring when the positive electrode, the solid electrolyte layer, and the negative electrode are pressurized and integrated, which contributes to reduction of resistance of the solid electrolyte layer. It is still another object to provide a lithium ion secondary battery having a low internal resistance by using this support.

Solution to Problem

A support according to the present invention has been made to solve the above problems, and has, for example, the following configuration.

That is, the support is a support included in a solid electrolyte layer of a lithium ion secondary battery, wherein said support is paper or a nonwoven fabric in which thermal dimensional change rates in a machine direction and a cross direction are both −10 to 5%, air permeability is 1 to 50 L/cm$^2$/min., and post-heat-treatment bending resistances in the machine direction and the cross direction are both in a range of 5 to 250 mN.

In addition, a lithium ion secondary battery of the present invention includes a solid electrolyte layer including the support of the above invention.

Advantageous Effects of Invention

According to the present invention, interfacial resistance between a positive electrode or a negative electrode and the solid electrolyte layer can be reduced by improving thermal dimensional stability of the support. In addition, the support that reduces internal resistance of the solid electrolyte layer can be obtained by improving permeability of a solid electrolyte into the support. Furthermore, the post-heat-treatment bending resistances of the support are optimized, so that the support can be obtained that suppresses deformation of the support inside the solid electrolyte layer, and maintains a pass line of lithium ions formed inside the solid electrolyte layer, which can contribute to reduction of internal resistance of the solid electrolyte layer.

Moreover, use of the support of the present invention in the lithium ion secondary battery can contribute to reduction of internal resistance of the battery.

DESCRIPTION OF EMBODIMENT

Hereinafter, an embodiment of the present invention will be described in detail.

In the present invention, a support used for forming a solid electrolyte layer present between a positive electrode and a negative electrode is configured in a lithium ion secondary battery configured as an all-solid-state battery.

The support of the present invention is a support included in a solid electrolyte layer of a lithium ion secondary battery, wherein said support is paper or a nonwoven fabric in which thermal dimensional change rates in a machine direction and a cross direction are both −10 to 5%, air permeability is 1 to 50 L/cm$^2$/min., and post-heat-treatment bending resistances in the machine direction and the cross direction are both in a range of 5 to 250 mN.

The solid electrolyte layer present between the positive electrode and the negative electrode is required to allow lithium ions to pass between the positive electrode and the negative electrode during charging and discharging. For this purpose, a pass line of lithium ions needs to be formed between the positive electrode and the solid electrolyte layer, inside the solid electrolyte layer, and between the solid electrolyte layer and the negative electrode. That is, when interfacial resistance between the positive electrode and the solid electrolyte layer and between the solid electrolyte layer and the negative electrode can be reduced and resistance inside the solid electrolyte layer can be reduced, internal resistance of the all-solid-state battery can be reduced.

The inventors of the present invention have found that interfacial adhesion between the solid electrolyte layer and the positive electrode or the negative electrode deteriorates due to irregularities generated on the surface of the solid electrolyte layer, as one of factors that inhibits further reduction of the interfacial resistance between the solid electrolyte layer and the positive electrode or the negative electrode in a conventional support. The irregularities on the surface of the solid electrolyte layer are generated by a dimensional change of the support by heat during drying when a solid electrolyte slurry is applied to the support and dried. In order to improve the interfacial adhesion, a pressure at the time of stacking, pressurizing, and integrating the positive electrode, the solid electrolyte layer, and the negative electrode can be increased. However, when the pressure is increased, the support inside the solid electrolyte layer may be deformed, and the pass line of lithium ions formed inside the solid electrolyte layer may be disconnected, resulting in an increase in internal resistance of the solid electrolyte layer.

On the other hand, in order to enhance thermal dimensional stability of the support, fibers having a high heat resistance can be used. However, it is necessary to contain a large amount of binder fibers having a large thermal dimensional change in order to form a sheet excellent in handleability, resulting in a deterioration of permeability of a solid electrolyte.

In a conventional case in which the solid electrolyte slurry is applied to the support and then dried, dimensions in each of the machine direction and the cross direction of the support may change. This thermal dimensional change is a phenomenon that occurs even when only the support is dried, and the fibers constituting the support are deformed by heating exceeding a melting point or a softening point. When the fibers constituting the support are deformed, a portion having a large thickness or a portion having a small thickness may be generated in the support to generate irregularities on the surface of the support. The support to which the solid electrolyte slurry is applied changes in dimensions by heating before a solvent contained in the solid electrolyte slurry is completely dried, so that irregularities are generated on the surface of the obtained solid electrolyte layer, and a decrease in strength occurs.

When the solid electrolyte layer having irregularities on the surface, the positive electrode, and the negative electrode are stacked, pressurized, and integrated, the interfacial adhesion between the positive electrode or the negative electrode and the solid electrolyte layer deteriorates. That is, it has been found that the interfacial resistance between the solid electrolyte layer and the positive electrode or the negative electrode can be further reduced by reducing the thermal dimensional change of the support and suppressing the deformation thereof. When the interfacial resistance between the solid electrolyte layer and the positive electrode or the negative electrode can be reduced, the internal resistance of the all-solid-state battery can be further reduced.

In the support of the present invention, the thermal dimensional change rate of the support in each of the machine direction and the cross direction is preferably in a range of −10 to 5%. Furthermore, from the viewpoint of reducing irregularities on the surface of the solid electrolyte layer, the thermal dimensional change rate of the support in each of the machine direction and the cross direction is more preferably in a range of −8 to 3%.

The thermal dimensional change rate in the present invention refers to a thermal dimensional change rate before and after heating at 200° C. for 1 hour. Heating at 200° C. for 1 hour is a heating condition under which the solvent used for the solid electrolyte slurry can be sufficiently dried. That is, when the thermal dimensional change rate of the support in each of the machine direction and the cross direction before and after heating at 200° C. for 1 hour is in the range of −10 to 5%, it is possible to suppress the generation of irregularities on the surface of the obtained solid electrolyte layer.

In addition, the interfacial adhesion at the time of integrating the positive electrode or the negative electrode and the solid electrolyte layer can be improved, and the interfacial resistance between the positive electrode or the negative electrode and the solid electrolyte layer can be reduced.

In the thermal dimensional change rate, a case with −(minus) sign indicates shrinkage, and a case with no sign indicates expansion.

In a case in which the thermal dimensional change rate of the support in either the machine direction or the cross direction is less than −10% (shrinkage of more than 10%), the support thermally shrinks greatly during drying of the solid electrolyte slurry, and large irregularities are generated on the surface of the obtained solid electrolyte layer. That is, the interfacial adhesion between the positive electrode or the negative electrode and the solid electrolyte layer is poor, and the interfacial resistance increases. In order to improve the interfacial adhesion, a pressure at the time of integrating the positive electrode, the solid electrolyte layer, and the negative electrode can be increased. However, the support inside the solid electrolyte layer may be deformed, and the pass line of lithium ions may be disconnected, which may lead to an increase in the internal resistance of the all-solid-state battery.

A case in which the thermal dimensional change rate of the support in either the machine direction or the cross direction exceeds 5% (expansion of more than 5%) indicates that the support cannot maintain its shape because the support is melted by heat or the like. In addition, an adhesive property at a contact point between the fibers constituting the support may decrease, leading to a decrease in the strength of the support. That is, practically, it is preferable that the thermal dimensional change rate of the support in each of the machine direction and the cross direction is 5% or less.

Furthermore, the following reason is considered as one of factors that inhibits further reduction of the internal resistance in the case of using a conventional support.

In the conventional support, although there are voids in the support, openings on the support surface may be small or the like. It is thus considered that the solid electrolyte cannot sufficiently permeate the support from the support surface. As a result, the pass line of lithium ions by the solid electrolyte cannot be formed inside the support, and the internal resistance of the solid electrolyte layer increases.

The inventors of the present invention have found that, in order to form the pass line of lithium ions between the positive electrode and the negative electrode, it is important to form a solid electrolyte layer having continuous connection from the surface of the support to the inside by the solid electrolyte, that is, it is important to sufficiently fill the inside of the support as well as to uniformly form the solid electrolyte on the surface of the support. By enhancing the permeability of the solid electrolyte into the support, the pass line of lithium ions can be formed inside the solid electrolyte layer, and the solid electrolyte layer having a low internal resistance can be formed.

In the embodiment of the present invention, the air permeability is adopted as an index for measuring the permeability of the solid electrolyte into the support. The air permeability indicates the amount of air flowing per unit area and unit time under a constant differential pressure. The higher the air permeability, the more air flows. That is, the higher the air permeability of the support, the more gas passes through the support. It is considered that the support having a high air permeability also increases the permeability of the solid electrolyte into the support. That is, the support having a high air permeability can be sufficiently filled with the solid electrolyte.

The support of the present invention has an air permeability in a range of 1 to 50 $L/cm^2/min$. Furthermore, from the viewpoint of the permeability of the solid electrolyte and uniform formation of the solid electrolyte layer, the air permeability is more preferably in a range of 2 to 40 $L/cm^2/min$.

The support having an air permeability within the above range is excellent in the permeability of the solid electrolyte, and the fibers overlap moderately in a thickness direction. In a case in which the solid electrolyte permeates the support, the permeation into the support is not inhibited. Therefore, it is possible not only to form the solid electrolyte on the surface of the support, but also to allow the solid electrolyte to permeate the support. As a result, the all-solid-state battery using this support can reduce the internal resistance.

When the air permeability is less than 1 $L/cm^2/min.$, the solid electrolyte cannot uniformly permeate the support in some cases. The reason is considered to be as follows.

In a case in which the solid electrolyte permeates the support, the fact that the air permeability is less than 1 $L/cm^2/min.$ means that the number of fibers constituting the support is large and the fibers are dense, to generate resistance when the solid electrolyte permeates the support. As a result, the solid electrolyte remains on the surface of the support, and the solid electrolyte is difficult to uniformly permeate the support.

On the other hand, in a case in which the air permeability exceeds 50 $L/cm^2/min.$, the effect of using the support cannot be obtained. In a support having an air permeability exceeding 50 $L/cm^2/min.$, the support is too sparse to hold and reinforce the solid electrolyte. Even if the solid electrolyte is caused to permeate, the solid electrolyte cannot remain in the support. Therefore, the solid electrolyte layer cannot be formed, or a strain of the solid electrolyte layer generated during drying cannot be suppressed, which may lead to the occurrence of cracks. That is, the support cannot hold and reinforce the solid electrolyte, and a thin and uniform solid electrolyte layer cannot be obtained, which are not preferable.

In addition, the inventors of the present invention have found that the bending resistance of the support after heating is one of factors that increases the internal resistance of the solid electrolyte layer using the conventional support.

In the solid electrolyte layer using the conventional support, when the positive electrode, the solid electrolyte layer, and the negative electrode are pressurized and integrated, the support is deformed, and the pass line of lithium ions inside the solid electrolyte layer formed in advance is disconnected, resulting in an increase in the internal resistance.

The solid electrolyte layer formed by causing the solid electrolyte slurry to permeate the support and drying the solid electrolyte slurry is pressurized to be integrated with the positive electrode and the negative electrode. That is, a stress is applied in a surface direction of the solid electrolyte layer. This stress is not completely uniform with respect to the surface of the solid electrolyte layer because the solid electrolyte layer, the positive electrode, and the negative electrode are not completely flat. That is, at the time of pressurization integration, a portion applied with a strong force and a portion applied with a weak force are generated in the surface of the solid electrolyte layer. The inventors of the present invention have found that the support inside the solid electrolyte layer is resultantly deformed according to the force, the solid electrolyte layer is cracked, and the pass line of lithium ions formed inside the solid electrolyte layer is disconnected.

In the embodiment of the present invention, the post-heat-treatment bending resistance of the support is adopted as an index of resistivity to a non-uniform force in the surface direction after the formation of the solid electrolyte layer. The heat treatment herein refers to heating at 200° C. for 1 hour, which is a heating condition under which the solvent used for the solid electrolyte slurry can be sufficiently dried. The bending resistance in the present invention is obtained from a maximum pressing force at the time of placing a test piece on a sample stage having a gap with a slit width of 6.5 mm, and lowering a blade by 8 mm from the surface of the sample stage. That is, the higher the maximum pressing force, the less easily the support is deformed.

In the support of the present invention, the post-heat-treatment bending resistance in each of the machine direction and the cross direction is controlled to be in a range of 5 to 250 mN. Furthermore, from the viewpoint of suppressing the increase in the internal resistance due to pressurization integration of the positive electrode, the solid electrolyte layer, and the negative electrode, it is more preferable that the post-heat-treatment bending resistance in each of the machine direction and the cross direction is in a range of 10 to 230 mN.

The support having a post-heat-treatment bending resistance within the above range can withstand a non-uniform stress applied to the solid electrolyte layer and suppress the deformation of the support. It is possible to pressurize and integrate the positive electrode, the solid electrolyte layer, and the negative electrode while maintaining the pass line of lithium ions inside the solid electrolyte layer formed in advance, and to suppress the increase in the internal resistance. As a result, by using this support, the internal resistance of the all-solid-state battery can be reduced.

When the post-heat-treatment bending resistance of the support in either the machine direction or the cross direction is less than 5 mN, the support is easily deformed. Thus, a support portion to which a strong force is applied follows the force to be deformed, and the solid electrolyte layer is also deformed to generate irregularities. As a result, a gap is formed at an interface between the positive electrode or the negative electrode and the solid electrolyte layer, and the pass line of lithium ions is disconnected.

On the other hand, in a case in which the post-heat-treatment bending resistance of the support in the machine direction and the cross direction exceed 250 mN, the support included in the solid electrolyte layer is hardly deformed, that is, too hard. Therefore, when the positive electrode, the solid electrolyte layer, and the negative electrode are pressurized and integrated, the support may change in structure such as breakage of the support. When the support changes in structure, the solid electrolyte layer is also deformed to generate cracks. This leads to disconnection of the pass line of lithium ions, and leads to an increase in the internal resistance.

The support of the present invention is formed of paper or a nonwoven fabric. The reason is as follows.

The paper refers to paper produced by agglutinating plant fibers or other fibers. In addition, the nonwoven fabric refers to a sheet-like material formed by processing a web of various fibers such as natural, regenerated, and synthetic fibers mechanically, chemically, thermally, or a combination thereof without using a loom, and joining constituent fibers together by an adhesive agent or a fusion force of the fibers themselves.

That is, since the paper or the nonwoven fabric has a configuration in which fibers are randomly disposed, the support formed of the paper or the nonwoven fabric has innumerable voids of various sizes and through-holes of various sizes therein. Therefore, the solid electrolyte partly remains on the surface of the support, partly permeates the support and remains therein, and partly passes through the through-holes from the front surface side from which the solid electrolyte permeates, and permeates to the back surface side, and the respective parts are continuous. That is, the support formed of the paper or the nonwoven fabric can form the solid electrolyte layer on the surface of the support, and can also be filled with the solid electrolyte.

Therefore, in the solid electrolyte layer fabricated using the paper or the nonwoven fabric as the support, the solid electrolyte not only exists on the surface of the support, but also fills the inside of the support, and a favorable pass line of lithium ions can be formed. As a result, the internal resistance of the solid electrolyte layer can be reduced, and the interfacial resistance between the solid electrolyte layer and the positive electrode or the negative electrode can be reduced. Consequently, the internal resistance of the all-solid-state battery can be reduced.

In addition, the support of the present invention preferably has a thickness in a range of 5 to 40 μm. The thickness is more preferably in a range of 8 to 30 μm.

In a case in which the thickness is less than 5 μm, the solid electrolyte layer having a small thickness is obtained, so that it is difficult to prevent a short circuit between the positive electrode and the negative electrode. In addition, in order to increase an inter-electrode distance for the purpose of preventing a short circuit, a thick solid electrolyte layer can be formed on the surface of the support. However, a layer of only the solid electrolyte is formed. That is, a portion with no support cannot suppress the strain of the solid electrolyte layer generated during drying, which may lead to the occurrence of cracks. On the other hand, in a case in which the thickness exceeds 40 μm, the solid electrolyte layer having a large thickness is obtained, which does not contribute to miniaturization of the all-solid-state battery.

The support preferably has a density in a range of 0.15 to 0.50 g/cm$^3$. More preferably, the density is in a range of 0.17 to 0.48 g/cm$^3$.

In a case in which the density is less than 0.15 g/cm$^3$, the number of fibers constituting the support decreases, and voids in the support increase. Therefore, the solid electrolyte does not remain in the support, and it is difficult to uniformly hold and reinforce the solid electrolyte. On the other hand, in a case in which the density exceeds 0.50 g/cm$^3$, the permeability of the solid electrolyte into the support deteriorates, and the support cannot be sufficiently filled with the solid electrolyte in some cases. Therefore, the internal resistance of the all-solid-state battery increases.

The support according to the present invention preferably has a maximum penetration area in a range of 0.001 to 0.3 $mm^2$ from the viewpoint of uniform formation of the solid electrolyte layer.

Since the support according to the present invention is formed of paper or a nonwoven fabric, the support has a structure in which fibers are laminated. As a result, a portion where no fiber exists, that is, a penetration portion exists in the thickness direction of the support. The solid electrolyte passes through the penetration portion of the support when permeating from the front surface to the back surface of the support.

The maximum penetration area in the present invention indicates the area of a largest penetration portion of the support. That is, the area of each of innumerable penetration portions of the support is equal to or less than the maximum penetration area. The support having a maximum penetration area in the range of 0.001 to 0.3 $mm^2$ is excellent in the permeability of the solid electrolyte into the support in the thickness direction, and holds and reinforces the solid electrolyte, so that the solid electrolyte layer can be uniformly formed.

In a case in which the maximum penetration area is less than 0.001 $mm^2$, the permeability of the solid electrolyte into the support in the thickness direction deteriorates, and the solid electrolyte layer cannot be uniformly formed. In addition, in a case in which the maximum penetration area exceeds 0.3 $mm^2$, the penetration portion is large. Thus, the solid electrolyte cannot be held on the support in some portion. As a result, cracks occur, and the solid electrolyte layer cannot be uniformly formed, so that the solid electrolyte layer having a high internal resistance is obtained.

The support according to the present invention preferably has a tensile strength of 1.0 N/15 mm or more. In a case in which the tensile strength is less than 1.0 N/15 mm, fracture tends to occur during filling with the solid electrolyte.

From the viewpoint of form maintenance of the support and the tensile strength, it is desirable that the support contains fibers having an adhesive force. Examples of the fibers having an adhesive force include beaten cellulose fibers, beaten polyamide fibers, and synthetic resin binders.

The adhesive force of the beaten cellulose fibers includes physical bonding due to entanglement between cellulose fibers and chemical bonding due to hydrogen bonding of hydroxyl groups of cellulose. In addition, the adhesive force of the beaten polyamide fibers includes physical bonding due to entanglement between polyamide fibers. Bonding by any of the fibers is preferable because it contributes to the form maintenance of the support and the exhibition of the tensile strength.

Examples of the synthetic resin binder fibers include those holding a fibrous state in a state of constituting the support, and those unable to hold a fibrous state, and assuming, for example, a film-like shape.

The synthetic resin binder fibers holding a fibrous shape in the state of constituting the support exhibits an adhesive force by thermally bonding a fiber entangling point. Therefore, the synthetic resin binder fibers holding a fibrous state as a constituent material of the support can reduce fracture in forming the solid electrolyte layer. Because only the fiber contact point is bonded, the synthetic resin binder fibers hardly inhibit the permeation of the solid electrolyte into the support.

On the other hand, in the synthetic resin binder fibers unable to hold a fibrous state in the state of constituting the support, the fibers are changed into a film-like shape by heat in a support production process, and resin constituting the fibers is melted by application of heat around a melting point or a softening point of the resin, and is fused at a fiber entangling point. That is, in a case in which the binder that is not in a fibrous state in the state of constituting the support is used, voids are blocked by, for example, a binder component forming a large number of film layers in voids between fibers of the support in exhibiting a binder function. As a result, the permeation of the solid electrolyte into the support may be inhibited, which is not preferable.

The material that can be used as the fibers having an adhesive force is not particularly limited as long as the fibers do not repel the solid electrolyte slurry, do not adversely affect the solid electrolyte physically and chemically, and have an insulating property. Examples thereof include beaten cellulose fibers, beaten polyamide fibers, polyamide binder fibers, and polyester binder fibers. In addition, one or more kinds of fibers selected from these fibers can be used.

Another material that can be used as the constituent material is not particularly limited as long as the material is fibers capable of holding a fibrous state even after heating at 200° C. for 1 hour, and the fibers do not repel the solid electrolyte slurry, do not adversely affect the solid electrolyte physically and chemically, and have an insulating property. Examples thereof include organic fibers such as cellulose fibers, polyamide fibers, and polyester fibers, and inorganic fibers such as glass fibers and alumina fibers. In addition, one or more kinds of fibers selected from these fibers can be used. By using these fibers, it is possible to obtain the support that suppresses the thermal dimensional change of the support, is excellent in fillability and heat resistance of the solid electrolyte, and has a favorable post-heat-treatment bending resistance.

Examples of the means for controlling the thermal dimensional change rate of the support in each of the machine direction and the cross direction to be in the range of −10 to 5% include, but are not limited to, a method in which a sheet containing 20 to 100% by mass of fibers having a thermal fiber-length change rate of −8 to 1% is heat-treated at a temperature higher than 200° C.

Examples of the means for controlling the post-heat-treatment bending resistance of the support in each of the machine direction and the cross direction to be in the range of 5 to 250 mN include, but are not limited to, a method of using fibers having a fiber length of 0.5 to 5 mm, a method of setting a basis weight in a range of 1 to 12 $g/m^2$, and a method of heat-treating a sheet at a temperature higher than 200° C.

It is preferable to use the fibers constituting the support of the present invention having an average fiber diameter of 1 to 20 μm. By using the fibers having an average fiber diameter of 1 to 20 μm, pores of various sizes can be uniformly distributed throughout the resulting paper or nonwoven fabric.

As a result, it is possible to form the support excellent in the permeability of the solid electrolyte and the post-heat-treatment bending resistance, and having a uniform thickness.

A method for producing the support is not particularly limited, and the support can be produced by a dry method or a wet method. However, a wet method in which fibers dispersed in water are deposited on a wire, dehydrated, and dried to make a paper sheet is preferable from the viewpoint of homogeneity of texture or the like of the support.

The embodiment for carrying out the present invention adopts paper or a wet nonwoven fabric formed using a papermaking method as the method for producing the support. A papermaking technique of the support is not particularly limited as long as the support can satisfy the thermal dimensional change rate, the air permeability, the post-heat-treatment bending resistance, the thickness, and the density. Papermaking techniques such as fourdrinier papermaking, tanmo papermaking, and cylinder papermaking can be adopted, and a plurality of layers formed by these paper-making methods may be combined. In addition, in paper-making, additives such as a dispersant, an antifoaming agent, and a paper strengthening agent may be added, and post-processing such as paper strengthening, lyophilic processing, calendering, thermal calendering, and embossing may be performed after formation of the paper layer.

(Method for Fabricating Support and all-Solid-State Battery and Method for Measuring Characteristics)

The method for fabricating the support and the all-solid-state battery of the present embodiment and the method for measuring characteristics were performed under the following conditions and methods.

[CSF Value]

A CSF value was measured according to "JIS P 8121-2 'Pulps-Determination of drainability-Part 2: "Canadian Standard" freeness method' (ISO 5267-2 'Pulps-Determination of drainability-Part 2: "Canadian Standard" freeness method')".

[Average Fiber Length]

[Fiber Length of Fibers]

A length-load average fiber length was measured and set as the fiber length of fibers by using a device described in "JIS P 8226-2 'Pulps-Determination of Fibre length by automated optical analysis-Part 2: Unpolarized light method'" (ISO 16065-2 'Pulps-Determination of Fibre length by automated optical analysis-Part 2: Unpolarized light method'), here, Fiber Tester PLUS (manufactured by Lorentzen & Wettre).

[Fiber Length of Polyester Fibers and Polyester Binder Fibers]

Since polyester fibers and polyester binder fibers are optically transparent, the fibers cannot be accurately recognized in an image. Thus, fiber length measurement by the above-described automated optical analysis could not be accurately performed. Therefore, the fiber lengths of the polyester fibers and the polyester binder fibers were measured by the following method.

A prepared specimen in which fibers were randomly dispersed was prepared. The fiber length of the fibers on the prepared specimen was directly measured using a scale.

[Thermal Fiber-Length Change Rate]

Average fiber lengths before and after heating at 200° C. for 1 hour were measured. A thermal fiber-length change rate was calculated by the following formula.

$$\text{Thermal fiber-length change rate } (\%) = [(L2 - L1)/L1] \times 100$$

L1: average fiber length before heating at 200° C. for 1 hour

L2: average fiber length after heating at 200° C. for 1 hour

[Thickness]

The thickness of one support was measured at equal intervals using a dial thickness gauge G type (measurement reaction force 2 N, probe: φ10 mm), and an average value of the measurement points was taken as the thickness (μm) of the support.

[Basis Weight]

The basis weight of the support in a bone dry condition was measured by a method defined in "JIS C 2300-2 'Cellulosic papers for electrical purposes-Part 2: Methods of test' 6 Basis Weight".

[Density]

The density of the support was calculated using the following formula.

$$\text{Density } (\text{g/cm}^3) = W/T$$

W: basis weight (g/m$^2$), T: thickness (μm)

[Porosity]

The porosity of the support was calculated using the following formula. In a case in which a plurality of materials constituting the support were mixed, the porosity was calculated after obtaining an average specific gravity of the constituent fibers by performing calculation proportional to a mixture ratio.

$$\text{Porosity } (\%) = (1 - (D/S)) \times 100$$

D: support density (g/cm$^3$), S: specific gravity of constituent fiber (g/cm$^3$)

[Air Permeability]

The air permeability of the support was measured by a method defined in "JIS L 1096 'Testing Methods for Woven and Knitted Fabrics', Air Permeability A Method (Frazier type)".

[Maximum Penetration Area]

From a range of 5 mm×5 mm, 100 optional penetration portions were extracted. Each of the extracted penetration portions was made approximate to a polygon, and the area of the polygon was calculated as a penetration area. A largest area among the measured 100 penetration areas was taken as the maximum penetration area.

[Thermal Dimensional Change Rate]

The length in the machine direction and the length in the cross direction of a test piece obtained by cutting the support into 100 mm×100 mm were measured. Next, the test piece of the support was heated at 200° C. for 1 hour, and each length of the heated test piece was measured. The thermal dimensional change rate in each of the machine direction and the cross direction was calculated by the following formula.

$$\text{Thermal dimensional change rate } (\%) = [(L2 - L1)/L1] \times 100$$

L1: length before heating at 200° C. for 1 hour, L2: length after heating at 200° C. for 1 hour

[Post-Heat-Treatment Bending Resistance]

A sample heated at 200° C. for 1 hour was cut into 200×200 mm. The post-heat-treatment bending resistance of the obtained test piece in each of the machine direction and the cross direction was measured by a method defined in "JIS L 1096 'Testing Methods for Woven and Knitted Fabrics' 8.21.5 Bending Resistance E Method (Handle 0-Meter method)".

[Tensile Strength]

A maximum tensile load of the support in the machine direction (production direction) was measured with a test width of 15 mm by a method defined in "JIS P 8113 'Paper and board-Determination of tensile properties-Part 2: Constant rate of elongation method'" (ISO 1924-2 'Paper and board-Determination of tensile properties-Part 2: Constant rate of elongation method'), and taken as the tensile strength of the support.

[Process of Fabricating all-Solid-State Battery]

An all-solid-state battery was fabricated using a support of each of Examples, Comparative Examples, Conventional Examples, and Reference Examples described below.

A specific fabrication method is as follows.

(Positive Electrode Structure)

A $LiNiCoAlO_2$ ternary powder used as a positive electrode active material, a $Li_2S$—$P_2S_5$ amorphous powder used as a sulfide-based solid electrolyte, and carbon fibers used as a conductive assistant were mixed together. A dehydrated xylene solution in which styrene-butadiene rubber (SBR) was dissolved as a binding agent was mixed with this mixture powder to prepare a positive electrode coating liquid. The positive electrode coating liquid was applied to an aluminum foil current collector as a positive electrode current collector, dried, and further rolled to obtain a positive electrode structure.

(Negative Electrode Structure)

Graphite used as a negative electrode active material, a $Li_2S$—$P_2S_5$ amorphous powder used as a sulfide-based solid electrolyte, polyvinylidene fluoride (PVdF) used as a binding agent, and N-methyl-2-pyrrolidone (NMP) used as a solvent were mixed together to prepare a negative electrode coating liquid. The negative electrode coating liquid was applied to a copper foil current collector as a negative electrode current collector, dried, and further rolled to obtain a negative electrode structure.

(Solid Electrolyte Layer)

A $Li_2S$—$P_2S_5$ amorphous powder used as a sulfide-based solid electrolyte, SBR used as a binding agent, and xylene used as a solvent were mixed together to prepare a solid electrolyte coating liquid.

The solid electrolyte coating liquid was applied to the support of each of Examples, Comparative Examples, Conventional Examples, and Reference Examples described below, and dried to obtain a solid electrolyte layer.

[Evaluation of Self-Supporting Property of Solid Electrolyte Layer]

A self-supporting property of each of the fabricated solid electrolyte layers was evaluated.

It was evaluated whether the fabricated solid electrolyte layer having a size of 92 mm×62 mm was able to be horizontally lifted up. A case in which the solid electrolyte layer was able to be horizontally lifted up while holding its shape was defined as ○, and a case in which the solid electrolyte layer did not hold its state when horizontally lifted up was defined as x.

[Production of all-Solid-State Battery]

A single cell of the all-solid-state battery was obtained by laminating the negative electrode structure having a size of 88 mm×58 mm, the solid electrolyte layer having a size of 92 mm×62 mm, and the positive electrode structure having a size of 87 mm×57 mm, and performing dry lamination to stick them together.

The obtained single cell was placed in an aluminum laminate film having terminals attached thereto, deaerated, and heat-sealed to be packed.

[Method for Evaluating all-Solid-State Battery]

Specific performance evaluation of the fabricated all-solid-state battery was performed under the following conditions and methods.

[Resistance]

The all-solid-state battery was charged to 4.0 V at a current density of 0.1 C under an environment of 25° C., and an impedance in a frequency range of 0.1 Hz to 1 MHz was measured using an LCZ meter. An arc portion of the obtained Cole-Cole plot was fitted into a semicircular shape with the x axis as the base, and a numerical value of a portion where a right end of the semicircle and the x axis intersect was taken as a resistance value.

[Discharge Capacity]

The all-solid-state battery was charged to 4.0 V at a current density of 0.1 C under an environment of 25° C., and then discharged to 2.5 V at a current density of 0.1 C, and a discharge capacity at this time was measured.

EXAMPLES

Hereinafter, specific examples or the like of the support according to the embodiment of the present invention will be described.

Example 1

A support having a thickness of 15 μm, a basis weight of 2.4 g/m$^2$, and a density of 0.16 g/cm$^3$ was obtained by performing cylinder papermaking using cellulose fibers having a freeness of 650 ml, a thermal fiber-length change rate of 0%, and a fiber length of 1.5 mm. Characteristics of the support of Example 1 are summarized in Table 2.

Example 2

A support having a thickness of 15 μm, a basis weight of 2.9 g/m$^2$, and a density of 0.19 g/cm$^3$ was obtained by performing tanmo papermaking using polyamide fibers having a freeness of 200 ml, a thermal fiber-length change rate of 0%, and a fiber length of 1.2 mm. Characteristics of the support of Example 2 are summarized in Table 2.

Example 3

A support having a thickness of 20 μm, a basis weight of 9.8 g/m$^2$, and a density of 0.49 g/cm$^3$ was obtained by performing tanmo papermaking using a starting material obtained by mixing 50% by mass of polyester fibers having a thermal fiber-length change rate of −1% and a fiber length of 3 mm, and 50% by mass of polyester binder fibers having a thermal fiber-length change rate of −18% and a fiber length of 3 mm. Characteristics of the support of Example 3 are summarized in Table 2.

Example 4

Cylinder papermaking was performed using a starting material obtained by mixing 50% by mass of polyester fibers having a thermal fiber-length change rate of −1% and a fiber length of 3 mm, and 50% by mass of polyester binder fibers having a thermal fiber-length change rate of −18% and a fiber length of 3 mm. The obtained nonwoven fabric was heat-treated to obtain a support having a thickness of 20 μm, a basis weight of 9.4 g/m$^2$, and a density of 0.47 g/cm$^3$. Characteristics of the support of Example 4 are summarized in Table 2.

Example 5

A support having a thickness of 15 μm, a basis weight of 5.0 g/m$^2$, and a density of 0.33 g/cm$^3$ was obtained by performing tanmo papermaking using a starting material obtained by mixing 20% by mass of polyester fibers having a thermal fiber-length change rate of −1% and a fiber length of 3 mm, and 80% by mass of polyester binder fibers having a thermal fiber-length change rate of −18% and a fiber length of 3 mm. Characteristics of the support of Example 5 are summarized in Table 2.

Example 6

A support having a thickness of 38 μm, a basis weight of 9.1 g/m$^2$, and a density of 0.24 g/cm$^3$ was obtained by performing tanmo papermaking using a starting material obtained by mixing 20% by mass of polyamide fibers having a thermal fiber-length change rate of −5% and a fiber length of 3 mm, and 80% by mass of polyamide binder fibers having a thermal fiber-length change rate of −11% and a fiber length of 3 mm. Characteristics of the support of Example 6 are summarized in Table 2.

Example 7

Cylinder papermaking was performed using a starting material obtained by mixing 50% by mass of cellulose fibers having a freeness of 400 ml, a thermal fiber-length change rate of 0%, and a fiber length of 1.1 mm, and 50% by mass of polyester binder fibers having a thermal fiber-length change rate of −18% and a fiber length of 3 mm. The obtained nonwoven fabric was heat-treated to obtain a support having a thickness of 20 μm, a basis weight of 7.0 g/m$^2$, and a density of 0.35 g/cm$^3$. Characteristics of the support of Example 7 are summarized in Table 2.

Example 8

Cylinder papermaking was performed using a starting material obtained by mixing 50% by mass of polyester fibers having a thermal fiber-length change rate of −1% and a fiber length of 3 mm, and 50% by mass of polyester binder fibers having a thermal fiber-length change rate of −18% and a fiber length of 3 mm. The obtained nonwoven fabric was heat-treated to obtain a support having a thickness of 9 μm, a basis weight of 2.7 g/m$^2$, and a density of 0.30 g/cm$^3$. Characteristics of the support of Example 8 are summarized in Table 2.

Example 9

A support having a thickness of 9 μm, a basis weight of 1.7 g/m$^2$, and a density of 0.19 g/cm$^3$ was obtained by performing tanmo papermaking using cellulose fibers having a freeness of 200 ml, a thermal fiber-length change rate of 0%, and a fiber length of 0.6 mm. Characteristics of the support of Example 9 are summarized in Table 2.

Example 10

A support having a thickness of 6 μm, a basis weight of 2.5 g/m$^2$, and a density of 0.42 g/cm$^3$ was obtained by performing fourdrinier papermaking using polyamide fibers having a freeness of 0 ml, a thermal fiber-length change rate of 0%, and a fiber length of 0.8 mm.

Characteristics of the support of Example 10 are summarized in Table 2.

Example 11

A support having a thickness of 28 μm, a basis weight of 11.9 g/m$^2$, and a density of 0.43 g/cm$^3$ was obtained by performing tanmo papermaking using a starting material obtained by mixing 50% by mass of polyester fibers having a thermal fiber-length change rate of −1% and a fiber length of 5 mm, and 50% by mass of polyester binder fibers having a thermal fiber-length change rate of −18% and a fiber length of 5 mm. Characteristics of the support of Example 11 are summarized in Table 2.

Example 12

A support having a thickness of 25 μm, a basis weight of 11.0 g/m$^2$, and a density of 0.44 g/cm$^3$ was obtained by performing tanmo papermaking using a starting material obtained by mixing 50% by mass of cellulose fibers having a freeness of 100 ml, a thermal fiber-length change rate of 0%, and a fiber length of 1.1 mm, and 50% by mass of polyester binder fibers having a thermal fiber-length change rate of −18% and a fiber length of 3 mm. Characteristics of the support of Example 12 are summarized in Table 2.

Comparative Example 1

A support having a thickness of 23 μm, a basis weight of 3.0 g/m$^2$, and a density of 0.13 g/cm$^3$ was obtained by performing cylinder papermaking using cellulose fibers having a freeness of 750 ml, a thermal fiber-length change rate of 0%, and a fiber length of 1.5 mm. Characteristics of the support of Comparative Example 1 are summarized in Table 2.

Comparative Example 2

A support having a thickness of 4 μm, a basis weight of 1.8 g/m$^2$, and a density of 0.46 g/cm$^3$ was obtained by performing tanmo papermaking using polyamide fibers having a freeness of 0 ml, a thermal fiber-length change rate of 0%, and a fiber length of 0.8 mm.

Characteristics of the support of Comparative Example 2 are summarized in Table 2.

Comparative Example 3

A support having a thickness of 15 μm, a basis weight of 5.0 g/m$^2$, and a density of 0.33 g/cm$^3$ was obtained by performing tanmo papermaking using a starting material obtained by mixing 80% by mass of polyester fibers having a thermal fiber-length change rate of −1% and a fiber length of 3 mm, and 20% by mass of polyethylene binder fibers having an unmeasurable thermal fiber-length change rate and a fiber length of 3 mm. Characteristics of the support of Comparative Example 3 are summarized in Table 2.

Comparative Example 4

A support having a thickness of 5 μm, a basis weight of 0.9 g/m$^2$, and a density of 0.18 g/cm$^3$ was obtained by performing tanmo papermaking using cellulose fibers having a freeness of 100 ml, a thermal fiber-length change rate of 0%, and a fiber length of 0.4 mm. Characteristics of the support of Comparative Example 4 are summarized in Table 2.

Conventional Example 1

With reference to the support described in Example 1 of Patent Literature 3, a support having a thickness of 19 μm, a basis weight of 3.7 g/m$^2$, and a density of 0.19 g/cm$^3$ was obtained by performing cylinder papermaking using a starting material obtained by mixing 15% by mass of polyester fibers having a thermal fiber-length change rate of −1% and a fiber length of 3 mm, and 85% by mass of polyester binder fibers having a thermal fiber-length change rate of −18% and a fiber length of 3 mm. Characteristics of the support of Conventional Example 1 are summarized in Table 2.

Conventional Example 2

A support produced by the same method as that described in Example 2 of Patent Literature 1 was fabricated to obtain a support of Conventional Example 2. In Conventional Example 2, a support having a thickness of 30 μm, a basis weight of 8.8 $g/m^2$, and a density of 0.29 $g/cm^3$ was obtained by etching a polyimide film and forming 200 μm square holes. Characteristics of the support of Conventional Example 2 are summarized in Table 2.

Conventional Example 3

With reference to the method for producing a support described in Example 1 of Patent Literature 2, a support having a thickness of 10 μm, a basis weight of 3.0 $g/m^2$, and a density of 0.30 $g/cm^3$ was obtained by performing cylinder papermaking using a starting material obtained by mixing 85% by mass of polyester fibers having a thermal fiber-length change rate of −1% and a fiber length of 3 mm, and 15% by mass of polyester binder fibers having a thermal fiber-length change rate of −18% and a fiber length of 3 mm. Characteristics of the support of Conventional Example 3 are summarized in Table 2.

Reference Example 1

With reference to the method for producing a nonwoven fabric base material 1 of Patent Literature 6, a nonwoven fabric base material having a thickness of 13 μm, a basis weight of 8.2 $g/m^2$, and a density of 0.63 $g/cm^3$ was obtained by performing cylinder papermaking, thermal calendering, and a heat treatment using a starting material obtained by mixing 70% by mass of polyester fibers having a thermal fiber-length change rate of −1% and a fiber length of 3 mm, and 30% by mass of polyester binder fibers having a thermal fiber-length change rate of −18% and a fiber length of 3 mm. Characteristics of the nonwoven fabric base material of Reference Example 1 are summarized in Table 2.

Reference Example 2

With reference to the method for producing a separator for an electrochemical element 1 of Patent Literature 5, a separator for an electrochemical element having a thickness of 25 μm, a basis weight of 12.2 $g/m^2$, and a density of 0.48 $g/cm^3$ was obtained by performing cylinder papermaking using a starting material obtained by mixing 20% by mass of polyamide fibers having a freeness of 0 ml, a thermal fiber-length change rate of 0%, and a fiber length of 0.7 mm, 20% by mass of acrylic fibers having a thermal fiber-length change rate of −10% and a fiber length of 3 mm, 50% by mass of polyamide fibers having a thermal fiber-length change rate of 0% and a fiber length of 5 mm, and 10% by mass of cellulose fibers having a freeness of 0 ml, a thermal fiber-length change rate of 0%, and a fiber length of 0.2 mm. Characteristics of the separator for an electrochemical element of Reference Example 2 are summarized in Table 2.

Reference Example 3

A support having a thickness of 15 μm, a basis weight of 5.0 $g/m^2$, and a density of 0.33 $g/cm^3$ was obtained by performing tanmo papermaking using a starting material obtained by mixing 40% by mass of polyester fibers having a thermal fiber-length change rate of −1% and a fiber length of 3 mm, 40% by mass of polyester binder fibers having a thermal fiber-length change rate of −18% and a fiber length of 3 mm, and 20% by mass of polyvinyl alcohol fibers having an unmeasurable thermal fiber-length change rate and a fiber length of 3 mm. Characteristics of the support of Reference Example 3 are summarized in Table 2.

Table 1 shows blended fiber names and blending ratios of the supports, the nonwoven fabric base material, and the separator for an electrochemical element of Examples 1 to 12, Comparative Examples 1 to 4, Conventional Examples 1 to 3, and Reference Example 1 to 3 described above.

TABLE 1

| | Support configuration | |
|---|---|---|
| | Fiber name | Blending ratio wt % |
| Example 1 | Cellulose | 100 |
| Example 2 | Polyamide | 100 |
| Example 3 | Polyester | 50 |
| | Polyester binder | 50 |
| Example 4 | Polyester | 50 |
| | Polyester binder | 50 |
| Example 5 | Polyester | 20 |
| | Polyester binder | 80 |
| Example 6 | Polyamide | 20 |
| | Polyamide binder | 80 |
| Example 7 | Cellulose | 50 |
| | Polyester binder | 50 |
| Example 8 | Polyester | 50 |
| | Polyester binder | 50 |
| Example 9 | Cellulose | 100 |
| Example 10 | Polyamide | 100 |
| Example 11 | Polyester | 50 |
| | Polyester binder | 50 |
| Example 12 | Cellulose | 50 |
| | Polyester binder | 50 |
| Comparative Example 1 | Cellulose | 100 |
| Comparative Example 2 | Polyamide | 100 |
| Comparative Example 3 | Polyester | 80 |
| | Polyethylene binder | 20 |
| Comparative Example 4 | Cellulose | 100 |
| Conventional Example 1 | Polyester | 15 |
| | Polyester binder | 85 |
| Conventional Example 2 | Form 200 μm square holes by etching polyimide film | |
| Conventional Example 3 | Polyester | 85 |
| | Polyester binder | 15 |
| Reference Example 1 | Polyester | 70 |
| | Polyester binder | 30 |
| Reference Example 2 | Polyamide | 20 |
| | Acryl | 20 |
| | Polyamide | 50 |
| | Cellulose | 10 |
| Reference Example 3 | Polyester | 40 |
| | Polyester binder | 40 |
| | Polyvinyl alcohol | 20 |

Table 2 shows evaluation results of the characteristics of the supports, the nonwoven fabric base material, the separator for an electrochemical element, the self-supporting properties of the solid electrolyte layers, and battery characteristics of Examples, Comparative Examples, Conventional Examples, and Reference Examples described above.

TABLE 2

| | Support characteristics | | | | | | | |
|---|---|---|---|---|---|---|---|---|
| | | | | | | | Thermal dimensional change rate | |
| | Thickness µm | Basis weight g/m$^2$ | Density g/cm$^3$ | Porosity | Air permeability L/cm$^2$/min. | Maximum penetration area mm$^2$ | Machine direction | Cross direction |
| Example 1 | 15 | 2.4 | 0.16 | 89.3 | 48.0 | 0.281 | 0.0 | 0.0 |
| Example 2 | 15 | 2.9 | 0.19 | 86.8 | 39.0 | 0.111 | 0.0 | 0.0 |
| Example 3 | 20 | 9.8 | 0.49 | 64.5 | 1.5 | 0.005 | −4.5 | −3.0 |
| Example 4 | 20 | 9.4 | 0.47 | 65.9 | 3.5 | 0.004 | −2.2 | −1.9 |
| Example 5 | 15 | 5.0 | 0.33 | 75.8 | 15.0 | 0.013 | −9.5 | −8.5 |
| Example 6 | 38 | 9.1 | 0.24 | 78.9 | 16.0 | 0.007 | −7.5 | −7.0 |
| Example 7 | 20 | 7.0 | 0.35 | 75.7 | 18.0 | 0.008 | 4.0 | 4.0 |
| Example 8 | 9 | 2.7 | 0.30 | 78.3 | 28.0 | 0.035 | 2.0 | 2.0 |
| Example 9 | 9 | 1.7 | 0.19 | 87.4 | 33.8 | 0.098 | 0.0 | 0.0 |
| Example 10 | 6 | 2.5 | 0.42 | 71.1 | 18.3 | 0.018 | 0.0 | 0.0 |
| Example 11 | 28 | 11.9 | 0.43 | 69.2 | 2.3 | 0.002 | −4.0 | −3.8 |
| Example 12 | 25 | 11.0 | 0.44 | 69.4 | 8.0 | 0.005 | −2.2 | −1.0 |
| Comparative Example 1 | 23 | 3.0 | 0.13 | 91.3 | 51.0 | 0.316 | 0.0 | 0.0 |
| Comparative Example 2 | 4 | 1.8 | 0.46 | 68.1 | 28.6 | 0.033 | 0.0 | 0.0 |
| Comparative Example 3 | 15 | 5.0 | 0.33 | 74.3 | 14.0 | 0.013 | 5.6 | 5.1 |
| Comparative Example 4 | 5 | 0.9 | 0.18 | 88.0 | 49.5 | 0.277 | 0.0 | 0.0 |
| Conventional Example 1 | 19 | 3.7 | 0.19 | 86.0 | 31.5 | 0.094 | −11.0 | −10.7 |
| Conventional Example 2 | 30 | 8.8 | 0.29 | 80.0 | 20.1 | 0.040 | 0.0 | 0.0 |
| Conventional Example 3 | 10 | 3.0 | 0.30 | 78.3 | 31.9 | 0.091 | −2.2 | −1.7 |
| Reference Example 1 | 13 | 8.2 | 0.63 | 58.0 | 0.7 | 0.0008 | −2.7 | −2.4 |
| Reference Example 2 | 25 | 12.2 | 0.48 | 65.5 | 0.6 | 0.0003 | −1.1 | −0.1 |
| Reference Example 3 | 15 | 5.0 | 0.33 | 75.8 | 9.4 | 0.009 | −5.1 | −4.0 |

| | Support characteristics | | | Solid electrolyte layer | Battery characteristics | |
|---|---|---|---|---|---|---|
| | Bending resistance | | | | | |
| | Machine direction mN | Cross direction mN | Tensile strength N/15 mm | Self-supporting property — | Resistance Ω · cm$^2$ | Discharge capacity mAh/g |
| Example 1 | 13 | 12 | 1.4 | — | 802 | 66 |
| Example 2 | 15 | 12 | 1.5 | ○ | 774 | 77 |
| Example 3 | 197 | 161 | 7.1 | ○ | 876 | 60 |
| Example 4 | 162 | 111 | 9.2 | ○ | 790 | 69 |
| Example 5 | 25 | 18 | 4.0 | ○ | 800 | 62 |
| Example 6 | 163 | 132 | 8.4 | ○ | 781 | 68 |
| Example 7 | 99 | 76 | 5.0 | ○ | 799 | 63 |
| Example 8 | 21 | 16 | 1.5 | ○ | 789 | 68 |
| Example 9 | 8 | 6 | 1.2 | ○ | 803 | 69 |
| Example 10 | 12 | 11 | 1.5 | ○ | 787 | 66 |
| Example 11 | 249 | 244 | 11.0 | ○ | 820 | 63 |
| Example 12 | 224 | 220 | 10.0 | ○ | 777 | 71 |
| Comparative Example 1 | 17 | 11 | 1.6 | — | — | — |
| Comparative Example 2 | 12 | 11 | 1.3 | ○ | — | — |
| Comparative Example 3 | 28 | 22 | 5.5 | | | |
| Comparative Example 4 | 11 | 4 | 1.1 | ○ | 1,123 | 49 |
| Conventional Example 1 | 22 | 14 | 3.8 | ○ | 1,035 | 50 |
| Conventional Example 2 | 103 | 101 | 6.1 | ○ | 1,498 | 49 |
| Conventional Example 3 | 11 | 10 | 0.7 | — | — | — |

TABLE 2-continued

| | | | | | | |
|---|---|---|---|---|---|---|
| Reference Example 1 | 142 | 104 | 5.8 | X | 110,001 | 0 |
| Reference Example 2 | 252 | 200 | 11.3 | X | 121,231 | 0 |
| Reference Example 3 | 32 | 20 | 5.5 | ○ | 1,523 | 48 |

Hereinafter, evaluation results of the all-solid-state batteries using the supports, the nonwoven fabric base material, and the separator for an electrochemical element of Examples, Comparative Examples, Conventional Examples, and Reference Examples will be described in detail.

The solid electrolyte layer using the support of each Example was able to form a solid electrolyte layer having a self-supporting property, unlike the solid electrolyte layers using the supports of Comparative Example 1, Comparative Example 3, and Conventional Example 3, the solid electrolyte layer using the base material for a separator of Reference Example 1, and the solid electrolyte layer using the separator for an electrochemical element of Reference Example 2.

The all-solid-state battery using the support of each Example had a lower resistance and a higher discharge capacity as compared with the all-solid-state batteries using the supports of Comparative Example 2, Comparative Example 4, Conventional Example 1, Conventional Example 2, and Reference Example 3, the all-solid-state battery using the base material for a separator of Reference Example 1, and the all-solid-state battery using the separator for an electrochemical element of Reference Example 2 as a support.

The support of each Example has a lower air permeability, a higher density, and a smaller maximum penetration area as compared with the support of Comparative Example 1.

The air permeability of the support of Comparative Example 1 is as high as 51.0 L/cm$^2$/min., the density is as low as 0.13 g/cm$^3$, and the maximum penetration area is as large as 0.316 mm$^2$. Therefore, it is considered that when the solid electrolyte coating liquid was applied to the support of Comparative Example 1 and dried, the support of Comparative Example 1 could not hold and reinforce the solid electrolyte, and the solid electrolyte could not uniformly remain in the support. Therefore, it was not possible to form a uniform solid electrolyte layer. As a result, it was not possible to fabricate the all-solid-state battery using the support of Comparative Example 1.

The comparison between each Example and Comparative Example 1 shows that an air permeability of more than 50 L/cm$^2$/min., a density of less than 0.15 g/cm$^3$, and a maximum penetration area of more than 0.3 mm$^2$ are not preferable.

The support of Comparative Example 2 is thinner than the support of each Example. Therefore, a short circuit occurred in the all-solid-state battery using the support of Comparative Example 2. This is considered to be because the support of Comparative Example 2 was as thin as 4 μm in thickness, and could not prevent a short circuit between the positive electrode and the negative electrode. Since a short circuit occurred, various battery evaluations of the all-solid-state battery using the support of Comparative Example 2 could not be performed. The comparison between each Example and Comparative Example 2 shows that the support having a thickness of less than 5 μm is not preferable.

The support of Comparative Example 3 expanded with a thermal dimensional change rate of 5.6% in the machine direction, and a thermal dimensional change rate of 5.1% in the cross direction as compared with the support of each Example. It is considered that the polyethylene binder contained in the support of Comparative Example 3 thermally changed when the solid electrolyte coating liquid was applied to the support and dried, and the support could not maintain its shape and expanded. Therefore, it was not possible to obtain a uniform solid electrolyte layer. That is, the comparison between each Example and Comparative Example 3 shows that the support having a thermal dimensional change rate of more than 5% in each of the machine direction and the cross direction is not preferable.

The all-solid-state battery using the support of Comparative Example 4 has a higher resistance and a lower discharge capacity as compared with the all-solid-state battery using the support of each Example. In addition, the support of Comparative Example 4 has a lower bending resistance of 4 mN in the cross direction as compared with the support of each Example.

The support of Comparative Example 4 has a low bending resistance in the cross direction. Thus, it is considered that the formed pass line of lithium ions was disconnected when the positive electrode, the solid electrolyte layer, and the negative electrode were pressurized and integrated after the formation of the solid electrolyte layer. The solid electrolyte layer, the positive electrode, and the negative electrode are not completely flat. Thus, when the solid electrolyte layer, the positive electrode, and the negative electrode are stacked and pressurized, a stress with strong and weak forces is applied to each of the solid electrolyte layer, the positive electrode, and the negative electrode. As a result, it is considered that a strong stress locally applied to the support caused deformation of a part of the support, and the formed pass line of lithium ions was disconnected following the deformation.

That is, the comparison between each Example and Comparative Example 4 shows that a bending resistance of less than 5 mN in each of the machine direction and the cross direction is not preferable.

The all-solid-state battery using the support of Conventional Example 1 has a higher resistance and a lower discharge capacity as compared with the all-solid-state battery using the support of each Example.

The support of Conventional Example 1 shrank with a thermal dimensional change rate of −11.0% in the machine direction, and a thermal dimensional change rate of −10.7% in the cross direction as compared with the support of each Example. Therefore, it is considered that the support of Conventional Example 1 shrank greatly when the solid electrolyte coating liquid was applied to the support and dried. As a result, it is considered that large irregularities were generated on the surface of the obtained solid electrolyte layer, and the interfacial adhesion between the positive electrode or the negative electrode and the solid electrolyte layer deteriorated when the positive electrode, the solid electrolyte layer, and the negative electrode were pressurized and integrated, resulting in an increase in the interfacial resistance.

That is, the comparison between each Example and Conventional Example 1 shows that a thermal dimensional change rate of less than −10.0% in each of the machine direction and the cross direction is not preferable.

The support of Conventional Example 2 is a support in which through-holes are formed in a film, unlike the support that is paper or a nonwoven fabric of each Example. The through-holes of the support of Conventional Example 2 can be filled with the solid electrolyte, which means that the solid electrolyte fills only the inside of the formed through-holes. In addition, in the solid electrolyte layer formed of the support of Conventional Example 2, it is considered that an interface between the film as an insulator and the positive electrode or the negative electrode exists at the interface between the positive electrode or the negative electrode and the solid electrolyte layer. It is considered that the resistance of the all-solid-state battery increased by this influence in the support of Conventional Example 2 as compared with the support of each Example.

The comparison between each Example and Conventional Example 2 shows that the paper or the nonwoven fabric is suitable as the support in order to reduce the resistance of the all-solid-state battery.

The support of each Example has a stronger tensile strength as compared with the support of Conventional Example 3.

The support of Conventional Example 3 became torn when the solid electrolyte coating liquid was applied and the excess coating liquid was removed. This is considered to be because the tensile strength of the support of Conventional Example 3 was as weak as 0.7 N/15 mm. In the support of Conventional Example 3, the solid electrolyte layer could not be formed. Thus, fabrication and evaluation of the all-solid-state battery ware not performed.

The comparison between each Example and Conventional Example 3 shows that a tensile strength of less than 1.0 N/15 mm is not preferable in order to suppress the fracture of the support at the time of producing the solid electrolyte layer.

Reference Example 1 shows a case in which the base material for a lithium ion secondary battery separator having a low heat shrinkage rate described in Patent Literature 6 was used as the support for an all-solid-state battery.

The base material for a separator of Reference Example 1 has a lower air permeability of 0.7 $L/cm^2/min.$, a higher density of 0.63 $g/cm^3$, and a smaller maximum penetration area of 0.0008 $mm^2$ as compared with each Example. Therefore, when the solid electrolyte coating liquid was applied to the base material for a separator of Reference Example 1, the solid electrolyte coating liquid did not permeate the support and remained on the surface of the support. Therefore, the solid electrolyte coating liquid was dried in the state of remaining on the surface of the support, and the solid electrolyte layer was formed on the surface of the support. Since the solid electrolyte layer formed on the surface of the support was dried in the absence of the support, the solid electrolyte was not reinforced. Thus, cracks occurred, the solid electrolyte layer was broken when lifted up, and had no self-supporting property.

Although the solid electrolyte layer using the base material for a separator of Reference Example 1 was cracked, the all-solid-state battery was able to be fabricated by stacking the solid electrolyte layer, the positive electrode, and the negative electrode.

The all-solid-state battery using the base material for a separator of Reference Example 1 had a much higher resistance as compared with the all-solid-state battery using the support of each Example, and could not be discharged. This is considered to be because the density was as high as 0.63 $g/cm^3$, the maximum penetration area was as small as 0.0008 $mm^2$, and the air permeability was as low as 0.7 $L/cm^2/min.$ The comparison between each Example and Reference Example 1 shows that the support having an air permeability of less than 1 $L/cm^2/min.$, a density of more than 0.50 $g/cm^3$, and a maximum penetration area of less than 0.001 $mm^2$ is not preferable.

Reference Example 2 shows a case in which the separator for an electrochemical element having a high heat resistance described in Patent Literature 5 was used as the support for an all-solid-state battery.

The separator for an electrochemical element of Reference Example 2 has a lower air permeability of 0.6 $L/cm^2/min.$, and a smaller maximum penetration area of 0.0003 $mm^2$ as compared with each Example. As a result, cracks occurred for the same reason as that of Reference Example 1, so that it was not possible to form a uniform solid electrolyte layer, and to form a self-supporting solid electrolyte layer.

Although the solid electrolyte layer using the separator for an electrochemical element of Reference Example 2 was cracked similarly to Reference Example 1, the all-solid-state battery was able to be fabricated by stacking the solid electrolyte layer, the positive electrode, and the negative electrode.

The all-solid-state battery using the base material for a separator of Reference Example 2 had a higher resistance as compared with the all-solid-state battery using the support of each Example and the all-solid-state battery using the base material for a separator of Reference Example 1, and could not be discharged. This is considered to be because the post-heat-treatment bending resistance in the machine direction was as strong as 252 mN, that is, the support was too hard, so that the support was broken at the time of pressurization integration of the positive electrode, the solid electrolyte layer, and the negative electrode, and cracks occurred inside the solid electrolyte layer. It is considered that the pass line of lithium ions was disconnected by the occurrence of cracks, and the resistance increased.

That is, the comparison between each Example and Reference Examples 1 and 2 shows that a bending resistance of more than 250 mN in each of the machine direction and the cross direction is not preferable.

The support of Reference Example 3 had a lower air permeability as compared with Example 5. As a result, the all-solid-state battery using the support of Reference Example 3 has a higher resistance and a lower discharge capacity as compared with the all-solid-state battery using the support of each Example.

The support of Reference Example 3 is a support obtained by blending 20% by mass of polyvinyl alcohol fibers in addition to polyester fibers and polyester binder fibers. The polyvinyl alcohol fibers are effective fibers for improving the tensile strength. The polyvinyl alcohol fibers can reinforce the fiber contact point and improve the tensile strength of the support by a shape change due to wet heat. However, it is considered that the polyvinyl alcohol fibers do not hold a fibrous state in a state of constituting the support, and forms a large number of film layers in the support to block voids between fibers. As a result, it is considered that the air permeability is lowered and the permeation of the solid electrolyte coating liquid into the support is inhibited.

That is, the comparison between Example 5 and Reference Example 3 shows that it is not preferable to blend the binder that cannot hold a fibrous state.

The above-described embodiment examples are merely examples, and for example, the composition and the like of the solid electrolyte, the positive electrode, and the negative electrode can be appropriately changed by those skilled in the art.

As described above, by using, as the support, the paper or the nonwoven fabric in which the thermal dimensional change rate in each of the machine direction and the cross direction is −10 to 5%, the air permeability is 1 to 50 L/cm$^2$/min, and the post-heat-treatment bending resistance in each of the machine direction and the cross direction is 5 to 250 mN, it is possible to obtain the support capable of reducing the interfacial resistance between the positive electrode or the negative electrode and the solid electrolyte layer, improving the permeability of the solid electrolyte into the support, and preventing the disconnection of the pass line of lithium ions formed inside the solid electrolyte layer. By using this support, the all-solid-state battery having a low resistance can be obtained.

The invention claimed is:

1. A support for a lithium ion secondary battery, said support being included in a solid electrolyte layer of a lithium ion secondary battery, wherein said support is paper or a nonwoven fabric in which thermal dimensional change rates in a machine direction and a cross direction are both −10 to 5%, air permeability is 1 to 50 L/cm$^2$/min., and post-heat-treatment bending resistances in the machine direction and the cross direction are both in a range of 5 to 250 mN.

2. The support for a lithium ion secondary battery according to claim 1, wherein the support has a thickness of 5 to 40 μm and a density of 0.15 to 0.50 g/cm$^3$.

3. A lithium ion secondary battery comprising a solid electrolyte layer including the support for a lithium ion secondary battery according to claim 1.

4. A lithium ion secondary battery comprising a solid electrolyte layer including the support for a lithium ion secondary battery according to claim 2.

* * * * *